United States Patent
Haratsch et al.

(10) Patent No.: US 7,920,143 B1
(45) Date of Patent: *Apr. 5, 2011

(54) METHOD FOR DEFINING ANIMATION PARAMETERS FOR AN ANIMATION DEFINITION INTERFACE

(75) Inventors: Erich Haratsch, Holmdel, NJ (US); Joern Ostermann, Red Bank, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1 day.

This patent is subject to a terminal disclaimer.

(21) Appl. No.: 11/841,356

(22) Filed: Aug. 20, 2007

Related U.S. Application Data

(63) Continuation of application No. 11/179,715, filed on Jul. 12, 2005, now Pat. No. 7,274,367, which is a continuation of application No. 10/291,428, filed on Nov. 12, 2002, now Pat. No. 6,970,172, which is a continuation of application No. 09/975,052, filed on Oct. 12, 2001, now abandoned, which is a continuation of application No. 09/031,728, filed on Feb. 27, 1998, now Pat. No. 6,154,222.

(60) Provisional application No. 60/041,732, filed on Mar. 27, 1997.

(51) Int. Cl.
 *G06T 15/00* (2006.01)
(52) U.S. Cl. ........ 345/473; 345/474; 345/475; 345/619; 715/815; 715/863; 706/101; 706/102
(58) Field of Classification Search .................. 345/473, 345/474, 475, 419, 619; 715/526, 850, 815, 715/863; 706/101, 102
See application file for complete search history.

(56) References Cited

U.S. PATENT DOCUMENTS

| | | | | | |
|---|---|---|---|---|---|
| 4,797,836 | A | * | 1/1989 | Witek et al. | 345/473 |
| 5,465,323 | A | * | 11/1995 | Mallet | 345/423 |
| 5,818,463 | A | * | 10/1998 | Tao et al. | 345/473 |
| 5,854,634 | A | | 12/1998 | Kroitor | |
| 5,923,337 | A | * | 7/1999 | Yamamoto | 345/473 |
| 5,999,944 | A | * | 12/1999 | Lipkin | 707/104.1 |
| 6,047,088 | A | * | 4/2000 | van Beek et al. | 382/243 |

(Continued)

FOREIGN PATENT DOCUMENTS

WO  WO 98/06069  2/1998

OTHER PUBLICATIONS

Tang et al., "Analysis-Based Facial Expression Synthesis", Nov. 13, 1994, pp. 98-102, Beckman Institute; University of Illinois at Urbana-Campaign.

Akimoto et al., "3D Facial Model Creation Using Generic Model and Front,and Side Views of Face", Mar. 2, 1992, pp. 191-197, IEICE Transactions on Information and Systems:Col. E75-D, No. 2.

(Continued)

*Primary Examiner* — Phu Nguyen

(57) ABSTRACT

A system and a computer-readable medium are provided for controlling a computing device to define a set of computer animation parameters for an object to be animated electronically. An electronic reference model of the object to be animated is obtained. The reference model is altered to form a modified model corresponding to a first animation parameter. Physical differences between the electronic reference model and the modified model are determined and a representation of the physical differences are stored as the first animation parameter. Altering of the reference model and determining of the physical differences are repeated. The stored parameters are provided to a rendering device for generation of the animation in accordance with the stored parameters. Determining physical differences between the electronic reference model and the modified model and storing a representation of the physical differences as the first animation parameter include comparing vertex positions of the reference model.

20 Claims, 2 Drawing Sheets

U.S. PATENT DOCUMENTS

| | | | | |
|---|---|---|---|---|
| 6,154,222 A * | 11/2000 | Haratsch et al. | ............... | 345/473 |
| 6,307,567 B1 | 10/2001 | Cohen-Or | | |
| 6,317,132 B1 | 11/2001 | Perlin | | |
| 6,326,971 B1 | 12/2001 | Van Wieringen | | |
| 6,664,956 B1 * | 12/2003 | Erdem | ........................... | 345/419 |
| 6,834,081 B2 * | 12/2004 | Kim et al. | ................. | 375/240.03 |
| 6,876,956 B1 * | 4/2005 | Cirak et al. | ........................ | 703/2 |
| 6,947,045 B1 * | 9/2005 | Ostermann et al. | ............ | 345/473 |
| 6,959,114 B2 * | 10/2005 | Kim et al. | ..................... | 382/232 |
| 6,970,172 B2 * | 11/2005 | Haratsch et al. | ............... | 345/473 |
| 7,026,960 B2 * | 4/2006 | Lee et al. | ......................... | 341/50 |
| 7,274,367 B2 * | 9/2007 | Haratsch et al. | ............... | 345/473 |

OTHER PUBLICATIONS

Choi et al., "Analysis and Synthesis of Facial Image Sequences in Model-Based Image Coding", Jun. 4, 1994, pp. 257-275, IEEE Transactions on Circuits and Systems for Video Technology, No. 3.

Haratsch et al., "Parameter Based Animation of Arbitary 3D Head Models", Picture Coding Symposium, PCS97 Berlin, Germany, Sep. 1997.

Doenges et al., "Audio/Video and Synthetic Graphics/Audio for Mixed Media", 1997, Signal Processing: Image Communication 9, pp. 433-463.

* cited by examiner

METHOD FOR DEFINING ANIMATION PARAMETERS FOR AN ANIMATION DEFINITION INTERFACE

This application is a continuation of U.S. patent application Ser. No. 11/179,715, filed Jul. 12, 2005, which is a continuation of U.S. patent application Ser. No. 10/291,428, filed on Nov. 12, 2002, now U.S. Pat. No. 6,970,172, which is a continuation of U.S. patent application Ser. No. 09/975,052, filed Oct. 12, 2001 and now abandoned, which is a continuation of U.S. patent application Ser. No. 09/031,728, filed on Feb. 27, 1998, now U.S. Pat. No. 6,154,222, issued on Nov. 28, 2000, which claims the benefit of U.S. Provisional Patent Application No. 60/041,732, filed on Mar. 27, 1997. The contents of the above U.S. Patents and provisional and non-provisional U.S. Patent Applications are herein incorporated by reference in their entirety.

The present invention generally relates to the field of computer animation and more particularly, is directed to a method for defining animation parameters for an animation definition interface.

BACKGROUND OF THE INVENTION

In recent years, advances in personal computer hardware has made it possible to process audio and digital images on the desktop. These advances were aided by the development of sophisticated formats and standards for coding audio-visual information, such as movies, video, music and the like, in digital compressed formats. Such formats allow large amounts of audio/video data to be processed with relatively low cost equipment.

Under the direction of the International Standards Organization (ISO) and the International Electro-Technical Commission (IEC), the "Moving Picture Experts Group" ("MPEG") was established to development the MPEG suit of standards for coding moving pictures and audio. The major advantage of MPEG over other video and audio standards is said to be much smaller file size for the same quality due to the efficient compression techniques employed.

MPEG encoded video files are typically "played" on a PC, Mac or other consumer electronics device using an MPEG video player and MPEG audio files are "played" using an MPEG audio player. Such players are readily available to PC users and the number of MPEG encoded video and audio files are steady growing.

As the need for more demanding and varied encoding schemes for video and audio content continue to increased, MPEG has been derived into the following categories:
  MPEG 1—Coding of moving pictures and associated audio for digital storage media at up approximately 1.5 Mbit/s;
  MPEG 2—Generic coding of moving pictures and associated audio information; and
  MPEG 4—Coding of audio-visual objects.

Along with the development of MPEG, real-time animation on the desk top also has gained popularity in recent years. Many real-time animation programs, including upcoming MPEG-4 terminals with face and body animation capabilities, can be used to run a proprietary renderer using a proprietary face or body model. Usually, animation of a proprietary model is not compatible with MPEG-4 requirements. Furthermore, the current implementation and modification of animation parameters, like smiles or eyebrow movement, with these renderers is cumbersome and time consuming.

Thus, there is a need in the art for an improved method of processing animation parameters.

SUMMARY OF THE INVENTION

Accordingly, it is an object of the present invention to obviate the above-noted shortcomings and disadvantages of real-time animation processes known in the prior art.

Another object of the present invention is to provide an animation definition interface for an MPEG renderer which can be easily and inexpensively implemented allowing for animation of arbitrary downloaded models in the MPEG-4 terminal.

It is another object of the present invention to provide an inexpensive and easily followed method for real-time animation.

The above mentioned disadvantages of prior art real-time animation with MPEG compliant renderers can be eliminated or substantially reduced by the present invention. In accordance with an aspect of the invention a computer-readable medium is provided. The computer-readable medium is a physical medium such as a personal computer hard drive, a tape drive, a compact disc, or random access memory that stores instructions for controlling a computing device to define a set of computer animation parameters for an object to be animated electronically. Animation may be achieved by electronically altering at least a portion of the object in a controlled manner. The instructions include instructions for obtaining an electronic reference model of the object to be animated, instructions for altering the electronic reference model to form a modified model corresponding to a first animation parameter, instructions for determining physical differences between the electronic reference model and the modified model and storing a representation of the physical differences as the first animation parameter, instructions for repeating the instructions for altering the reference model and the instructions for determining the physical differences between the reference model and the modified model and storing a representation of the physical differences as the first animation parameter for each of the animation parameters to be defined, and instructions for providing the stored parameters to a rendering device for generation of the animation in accordance with the stored parameters. The instructions for determining physical differences between the reference model and the modified model and storing a representation of the physical differences as the first animation parameter further include instructions for comparing vertex positions of the reference model.

In a second aspect of the invention, a system is provided for defining a set of computer animation parameters for an object to be animated electronically. The animation is achieved by electronically altering at least a portion of the object in a controlled manner. Example computer hardware, as would be known to one of skill in the art, includes a hard drive storing a computer program that may be loaded into computer memory and run by a central processing unit to carry out the various functions directed by the computer program. The system includes means for obtaining an electronic reference model of the object to be animated, means for altering the electronic reference model to form a modified model corresponding to a first animation parameter, means for determining the physical differences between the electronic reference model and the modified model and storing the differences as the first animation parameter, means for repeating the altering and the determining for each of the animation parameters to be defined, means for providing the stored parameters to a rendering device for generation of the animation in accordance with the stored parameters, means for storing the animation parameters as a lookup function in a table, and means for including the definition of an object as a scenegraph and the definition of high level animation parameters to allow rigid and flexible deformation.

BRIEF DESCRIPTION OF THE DRAWINGS

The novel features of the present invention are set out with particularity in the appended claims, but the invention will be understood more fully and clearly from the following detailed description of the invention as set forth in the accompanying drawings, in which:

DESCRIPTION OF THE PREFERRED EMBODIMENT

The MPEG-4 standard described above strives to define a standardized interface to allow animation of face and body models within an MPEG-4 terminal. Due to the rapid advances in computer graphics hardware, it is not foreseen that MPEG-4 will standardize face and body models. Instead, face and body definition parameters ("FDP", "BDP") are defined for specifying the shape and surface of a model. For the animation of the models, face and body animation parameters ("FAP", "BAP") are standardized.

These animation parameters include low-level parameters like "move left eyebrow up" and "tongue roll" as well as high-level parameters like "smile". Assuming that different terminals allow for models with different degrees of complexity, a process is required that allows the rapid development of models suited for animation. The use of standardized file format like Virtual Reality Modeling Language ("VRML") allow the use of commonly available modeling software (modelers), like COSMO 3D or PowerAnimator, to design animations. However, formats like VRML 1, VRML 2, and OpenInventor only support the description of rigid objects.

VRML was conceived in the early part of 1994 and was developed in response to a need for a three dimensional graphical visualization standard. VRML 1.0 was the first version of the standard and provided basic support for describing three dimensional objects such as spheres, planes, cubes cylinders, cones and the like.

Version 2.0 of the VRML standard built on the progress of Version 1.0 by adding such capabilities as object behavior.

Face and body animation requires flexible deformation. Such a feature is not currently conveniently supported by OpenInventor or VRML 2. Accordingly, real-time renders which are designed to read and write VRML or OpenInventor files must be modified in order to accommodate animation. In addition, convenient editors for defining the animation capabilities are not known in the prior art.

In accordance with the present invention, an interface between a modeler, e.g., Alias/Wavefront Power Animator, and real-time animation software is provided. The present invention allows for the rapid definition, modification and implementation of animation parameters. Since the interface reads VRML files from the modeler, it is independent of the modeler. The interface writes a VRML file and one accompanying table for each defined animation parameter thus making this information easily integrate able into proprietary renderers.

Figure 1:
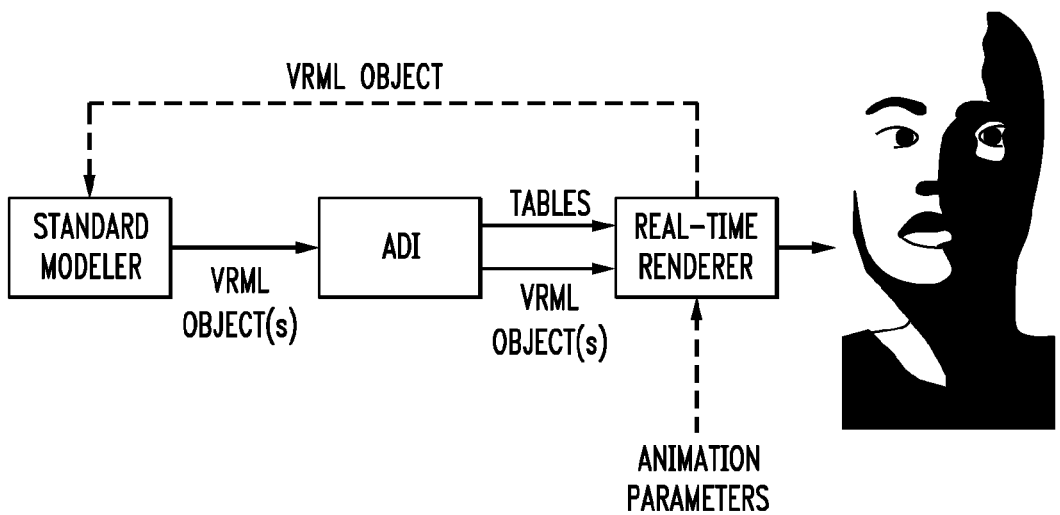
FIG. 1 illustrates how the animation definition interface of the present invention is integrated with a modeler and renderer.

The interface of the invention takes as its input several VRML files describing static models with a topology appropriate for the renderer. FIG. 1 illustrated how the system is integrated with the modeler and the renderer. The model of the renderer is exported as a VRML file and read into the modeler. In order to design the behavior of the model for one animation parameter, the model is deformed using the tools of the modeler. Usually, restrictions on the topology of the model exist. For simplicity, it is assumed that the model is deformed only by moving relevant vertices and not by changing its topology. The modeler exports the deformed model as a VRML file.

The Animation Definition Interface ("ADI") compares the output of the modeler with its input, i.e., the model exported from the renderer. By comparing vertex positions of the two models, the vertices affected by the newly designed animation parameter can be identified. The ADI computes for each affected vertex a 3D displacement vector defining the deformation and exports this information in a table.

The renderer reads the VRML file of the model and the table in order to determine the definition of the new animation parameter. The renderer can now use the newly defined animation as required by the animation parameters.

Most of the newly available graphics boards for PCs and workstations support rendering based on the OpenGL engine. The VRML 2 file format is based on OpenInventor that itself is based on OpenGL. Thus, it is essential to enable real-time deformations of models rendered on an OpenGL engine. Use of a scene graph usually does not allow the movement of parts of an object. Therefore, the vertex positions of the scene graph are updated through the animation parameters as defined in the table. Only the vertex coordinates of the scene graph are updated thus allowing one to take full advantage of the OpenGl rendering engine speed for global motions, lighting texture mapping, etc.

Figure 2:
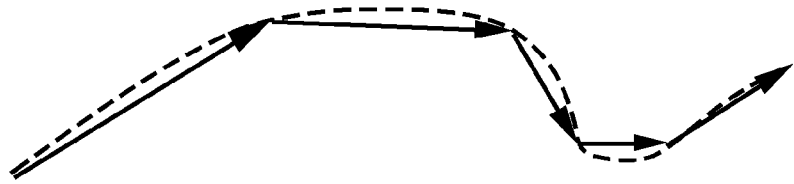
FIG. 2 illustrates the piece-wise linear approximation of a complex deformation applied to a vertex of the uniform model.

The conversion process described above allows the renderer to only create deformations of moving vertices along the defined 3D displacement vector. While this might be sufficient for simple actions like move "left eye brow up", complex motions like "smile" or "tongue roll up" can not be sufficiently modeled by linearly moving vertices. Thus, in accordance with the present invention, several VRML files are created for different phases of the animation or values of the animation parameter. Such files allow for a piece-wise linear approximation of complex deformations. This process is illustrated in FIG. 2.

The following table shows an example of an animation parameter ("AP") definition for 2 vertices, where the 3-D motion is defined in 3 intervals. The parameter AP is positive and in Interval 1 is valid for $0<AP<=0.33$, in Interval 2 is valid for $0.33<AP<=0.66$ and in Interval 3 is valid for $0.66<AP<=1.0$.

| Vertex No. | $1^{st}$ Interval | $2^{nd}$ Interval | $3^{rd}$ Interval |
|---|---|---|---|
| 5 | (0.1, 0.7, −5) | (0, 2, 4) | (0, 0.1, −0.1) |
| 13 | (3, 4, −2) | (3, 2, 4) | (−1, −2, −3) |

Given AP=0.3, vertex 5 would be displaced by:

$$0.3 \times (0.1, 0.7, -5)^T.$$

For AP=0.6, vertex 5 would be displaced by:

$$0.33 \times (0.1, 0.7, -5)^T + (0.6 - 0.33) \times (0, 2, 4)^T.$$

The above approach can be extended in order to allow positive and negative animation parameters as well as unequal intervals for defining the motion of a vertex. Other extensions include replacing the linear approximation of the vertex motion by general functions like polynomials. These functions could be different for each animation parameter. A further generalization is to make these functions dependent on more than one animation parameter.

For a smile, writing three files with "smile=0.3", "smile=0.7" and "smile=1.0" are sufficient to allow for a subjectively pleasant piece-wise linear approximation of this relatively complex deformation.

The above outlined procedure can be used to define the entire set of MPEG-4 FAPs for a proprietary face animation renderer. The model is an extension of Parke's model. Applicants have found that FAPs integrate nicely with the model's talking capability controlled by a TTS system.

Figure 3:
FIG. 3 illustrates the use of MPEG-4 for animation of computer graphics heads by synthetic speech and animation parameters.

Animated sequences using different personalities also are illustrated in FIG. 3.

Arbitrary head models in VRML and animation tables can be created in two ways, a natural for personalized head models and a synthetic one.

In the natural approach, a VRML model of a person's head is created by, for example, using cyberscan data. The animation table is generated by image analysis. Images of the person are taken in a neutral state and for each facial expression corresponding to the different animation parameters. The method described above could be used to calculate the displacement vectors for IndexedFaceSet nodes. Applying this algorithm for different intensities of the person's expression improves the realism of the facial movements during animation. An animation system which downloads a person's data obtained in this way represents a new architecture for a primitive model-based decoder.

An example of how the present invention may be implemented will now be described.

| ASCII Specifiction-FDP | | | | |
|---|---|---|---|---|
| 000 000 | exposedField | SFNode | featurePointsCoord | NULL |
| 001 001 | exposedField | SFNode | textureCoord4Feature Points | NULL |
| 010 010 | exposedField | SFNode | calibrationMesh | NULL |
| 011 011 | exposedField | SFNode | faceTexture | NULL |
| 100 100 | exposedField | MFNode | animationDefinitionTables[ ] | NULL |
| 101 101 | exposedField | SFNode | faceSceneGraph | NULL |

The FDP node defines the face model to be used at the receiver. Two options can be supported:
1. calibration information is downloaded, so that the proprietary face of the receiver can be configured using facial feature points and optionally a 3D mesh or texture; and
2. a face model is downloaded with the animation definition of the Facial Animation Parameters. This face model replaces the proprietary face model in the receiver.

Each field may be described as follows:

| | |
|---|---|
| featurePointsCoord | contains a Coordinate node. Specifies feature points for the calibration of the proprietary face. The coordinates are listed in the "point" field in the Coordinate node in the prescribed order, that a feature point with a lower label is listed before a feature point with a higher label (e.g. feature point 3.14 before feature point 4.1). |

-continued

| | |
|---|---|
| textureCoord4-Feature Points | contains a TextureCoordinate node. Specifies the texture coordinates for the feature points. |
| calibrationMesh | contains an IndexedFaceSet node. Specifies a 3D mesh for the calibration of the proprietary face model. All fields in the IndexedFaceSet node can be used as calibration information. |
| faceTexture | contains an ImageTexture or PixelTexture node. Specifies texture to be applied on the proprietary face model. |
| animationDefinition tables | contains AnimationDefinitionTable nodes. If a face model is downloaded, the behavior of FAPs is defined in this field. |
| faceSceneGraph | contains a Group node. Grouping node for face model rendered in the compositor. Can also be used to download a face model: in this case the effect of Facial Animation Parameters is defined in the "animationDefinitionTables" field. |

Other ASCII specifications are set forth in the tables below:

| ?? | | AnimationDefinitionTable | | | | |
|---|---|---|---|---|---|---|
| 00 | field | SFInt | fapID | 1 | 1 | 68 |
| 01 | field | SFInt | highLevelSelect | 1 | 1 | 64 |
| 10 | 0 exposedfield | Mfnode | table [ ] NULL | | | |

| ?? | | AnimationDefTransform | | |
|---|---|---|---|---|
| 00 | field | ?? | nodeIDTransform | " " |
| 01 | field | SFString | fieldID | na |
| 10 | field | GenericSF | fieldValue | na |

| ? | | AnimationDefIndexedFaceSet | | |
|---|---|---|---|---|
| 00 | field | ?? | nodeIDIndexedFaceSet | |
| 01 | field | MFInt32 | intervalBorders [ ] | |
| 10 | field | MFint32 | coordIndex [ ] | |
| 11 | field | MFVec3f | displacements [ ] | |

While the present invention has been described with respect to a preferred embodiment, the invention is not limited thereto. In general, this version is applicable when defining animation parameters defining flexible deformation of computer graphic models. The scope of the invention is limited only by the attached claims.

We claim as our invention:

1. A system for enabling animation of an object, the system comprising:
    a processor;
    a first module configured to control the processor to obtain a reference model of an object to be animated, wherein the object is defined as a scene graph comprising a data structure having vertex coordinates;
    a second module configured to control the processor to alter the reference model to form a modified model corresponding to a first animation parameter, and independent of motion between the reference model and the modified model;
    a third module configured to control the processor to determine physical differences between the reference model and the modified model and store the differences; and a fourth module configured to control the processor to provide the stored differences to a rendering device for animating the object in accordance with the differences.

2. The system of claim 1, further comprising a fifth module configured to control the processor to store the differences as a lookup function in a table.

3. The system of claim 2, further comprising a sixth module configured to control the processor to convert the animation parameters to a format for downloading to the rendering device along with the reference model.

4. The system of claim 1, wherein a definition of high level animation parameters allow rigid and flexible deformation.

5. The system of claim 4, wherein the high level animation parameters correspond to rigid motion and rigid and flexible deformation.

6. The system of claim 4, further comprising a fifth module configured to control the processor to download the object to a client for animation.

7. The system of claim 4, further comprising a fifth module configured to control the processor to download the object to a player that animates the object with animation parameters.

8. The system of claim 1, further comprising a fifth module configured to control the processor to define a major animation parameter, the fifth module further comprising:
   a sixth module configured to control the processor to define a plurality of associated animation parameters representing an animation sequence; and
   a seventh module configured to control the processor to store the plurality of associated animation parameters as major parameters.

9. The system of claim 8, further comprising an eighth module configured to control the processor to define a plurality of the major animation parameters, wherein each of the major animation parameters presents a different animation sequence.

10. The system of claim 9, further comprising a ninth module configured to control the processor to define a super animation parameter, the ninth module configured to define a super animation parameter and further comprising:
   a tenth module configured to control the processor to combine a plurality of the major animation parameters; and
   an eleventh module configured to control the processor to store the plurality of major animation parameters as the super animation parameter.

11. The system of claim 9, further comprising a ninth module configured to control the processor to define a plurality of the major animation parameters, wherein each of the major animation parameters presents a different human expression.

12. The system of claim 11, further comprising a tenth module configured to control the processor to define a super animation parameter, the tenth module configured to define a super animation parameter and further comprising:
   an eleventh module configured to control the processor to combine a plurality of the major animation parameters; and
   a twelfth module configured to control the processor to store the plurality of major animation parameters as the super parameter.

13. The system of claim 1, wherein the object includes characteristics of a human being and the system further comprises a fifth module configured to control the processor to define a major animation parameter representing a human expression, the fifth module configured to define a major animation parameter representing a human expression and further comprising:
   a sixth module configured to control the processor to define a plurality of animation parameters representing the human expression; and
   a seventh module configured to control the processor to store the plurality of animation parameters as major parameters.

14. The system of claim 13, further comprising an eighth module configured to control the processor to store the animation parameters as function in a look up table.

15. The system of claim 13, wherein the major animation parameters represent at least one of a smile, a frown, the movement of an eye, an eye wink, a tongue roll, the movement of a mouth, simulated speech, a human gesture, visemes, and deformation at the joints of a simulated human skeleton.

16. The system of claim 1, wherein the animation is described by spline functions.

17. The system of claim 1, wherein the animation is described by rational polynomial functions.

18. The system of claim 1, wherein the animation is described by general functions.

19. A rendering device comprising:
   a processor;
   a first module configured to control the processor to receive stored parameters for use in rendering an object, wherein the object is defined as a scene graph comprising a data structure of interconnected nodes; and
   a second module configured to control the processor to render the object according to the stored parameters, wherein the stored parameters are generated by a process comprising:
      obtaining a reference model of the object to be animated;
      altering the reference model to form a modified model corresponding to a first animation parameter, and independent of motion between the reference model and the modified model;
      determining physical differences between the reference model and the modified model; and
      storing the differences as the stored parameters.

20. A method of rendering an object on a rendering device, the method comprising:
   receiving via a processor stored parameters for use in rendering an object, wherein the object is defined as a scene graph comprising a data structure of interconnected nodes; and
   rendering via a processor the object according to the stored parameters, wherein the stored parameters are generated by a process comprising:
      obtaining a reference model of the object to be animated;
      altering the reference model to form a modified model corresponding to a first animation parameter, and independent of motion between the reference model and the modified model;
      determining physical differences between the reference model and the modified model; and
      storing the differences as the stored parameters.

* * * * *